J. J. GREENOUGH.
Gear Cutting-Machines.
No. 135,218.  Patented Jan. 28, 1873.
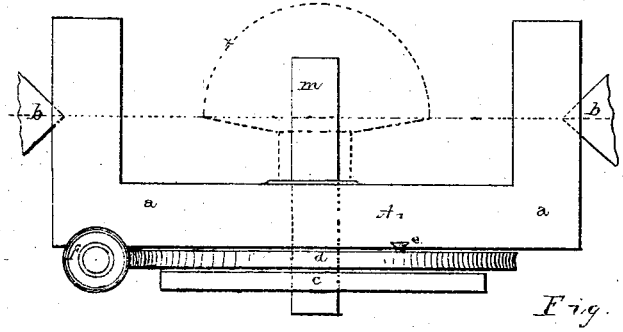
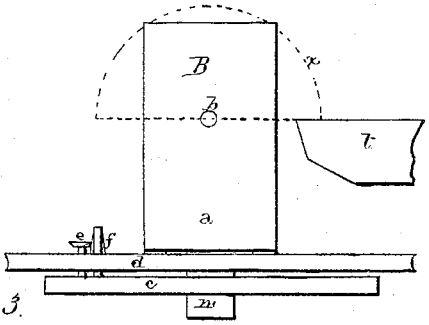
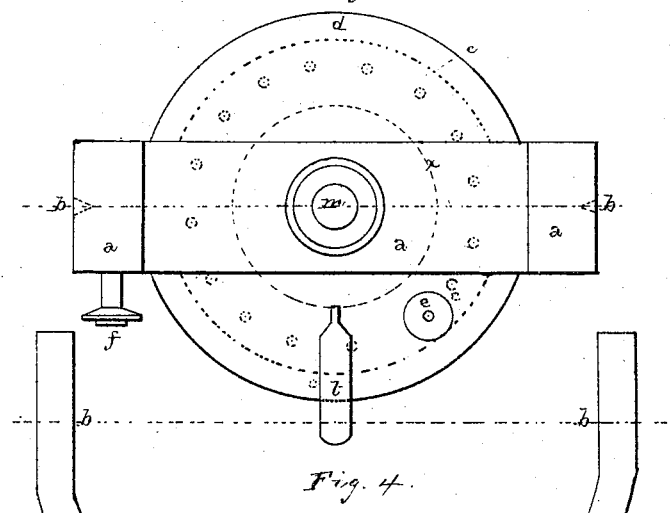
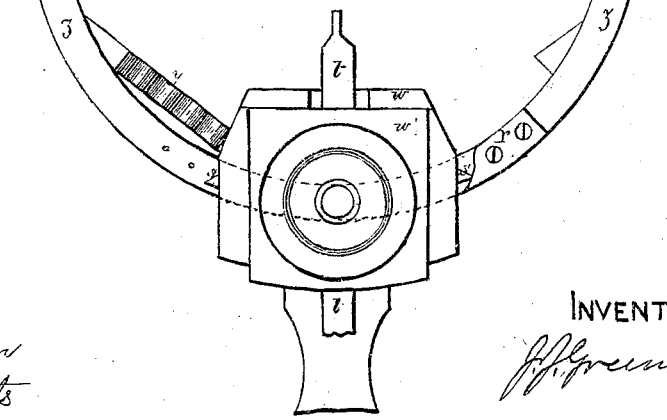

UNITED STATES PATENT OFFICE.

JOHN JAMES GREENOUGH, OF SYRACUSE, NEW YORK.

IMPROVEMENT IN GEAR-CUTTING MACHINES.

Specification forming part of Letters Patent No. 135,218, dated January 28, 1873.

*To all whom it may concern:*

Be it known that I, JOHN JAMES GREENOUGH, of Syracuse, New York, have invented a new and useful Gear-Cutter for Cutting the Teeth of Wheels, of which the following is a specification:

The purpose of this invention is to cut with accuracy cogs or teeth on a spherical surface or section so as to form a semi-spherical or segment gear. Having found the gear-cutters heretofore made insufficient to cut radial gear upon a spherical surface, I have devised the following-described apparatus:

In the drawing illustrating this invention, Figure 1 is a front elevation of the mandrel and frame with the attachments thereto. Fig. 2 is an end elevation at right angles to Fig. 1. Fig. 3 is a plan of the above parts. Fig. 4 is the tool-block and holder.

In Figs. 1, 2, 3, $a$ is the frame supporting the mandrel and its attachments, consisting of a straight base with a standard at each end, or the equivalents thereof. This may be made a fixture, or hung on centers or trunnions at $b$, as will hereafter appear. $m$ is a mandrel that fits tightly in its bearing in the frame $a$, so as to stand and turn with great accuracy. On this mandrel an index-wheel, $c$, is so affixed as to turn with it. This index is graduated and spaced off for the gear to be cut, as in ordinary gear-cutters. The blank to be cut, which is the segment of a sphere or other curved surface, is affixed to the upper end of the mandrel, as indicated by the dotted lines $x$.

If this apparatus is to be used in a lathe it is suspended on the centers $b$, and the tool $t$ is set with its cutting-point exactly on a level with the centers $b$, and in the direction of a radial line drawn from the center of the mandrel at right angles to the plane of the centers. Thus arranged, if the frame $a$ is made to revolve with blank $x$ in contact with the tool $t$, a cut will be made from the base to the apex at the center of the mandrel, and by cutting as deep as the tooth to be formed a radial groove will be cut; then, by turning the index and repeating the operation, a series of such cuts will be made, equal to the number of spaces between the teeth spaced off by said index $c$; but, in addition to this, it is necessary to have the face of each tooth properly curved, and for this purpose I put a forming-wheel, $d$, loosely upon the mandrel and couple the index-wheel $c$ with it by a pin, $e$, that enters the holes in said index-wheel that mark the number of teeth to be cut; the wheel $d$ is turned by a tangent-screw, $f$, acting on its periphery, which moves it either way and holds it firmly in place. Now, it will be seen that if, as the cutting-tool $t$ is forced forward to make the several cuts for the depth of the tooth, the tangent-screw revolves the blank with the mandrel at each cut, the compound motion will form a curved surface which can be made to form a perfect outline of the cross-section of a tooth. To determine these combined motions a templet may be used, or the figure drawn on the base of the tooth to which the operator cuts.

An important modification of this device, and the one I prefer, is to make the frame $a$ stationary, and hanging a tooth-holder frame, $z$, Fig. 4, on its center points $b$, the two arms of which are straight and connected by a bar curved on a circle concentric with the center of the mandrel on the line of the centers $b$ at right angles therewith. The cross-section of this bar may be rectangular, or any other straight-sided figure to properly hold the tool-block $w$, which I fit onto this curved part of frame $z$ so as to slide along its curve. The upper part $w'$ of this tool-block slides radially to and from the center of the mandrel, on the point aforesaid, level with the centers $b$. Into this upper slide $w'$ of the tool-block the cutting-tool $t$ is fitted, as in an ordinary adjustable tool-block of a lathe, so well known as to need no particular description. The tool $t$ is moved forward and back on the radial line by a screw forming a part of the handle $h$, and stop-screws and the like may be added, as in other tool-blocks.

For cutting a perfect tooth, the relative positions of the line of centers $b$ and the mandrel must change around the circle of which the mandrel-axis is the center. This is done by the tangent-screw before described, or a templet that properly regulates their relative positions, so that, by the compound movement of the semi-sphere on its axis relatively to the centers $b$ and the movement of the tool or mandrel a quarter circle on the centers $b$ concentric with the semi-sphere $x$, the proper shape and curve are given to the face of the tooth. The index $c$ spaces off the gear as in ordinary gear-cutters, and the forming-wheel $d$ shapes the face of the teeth by changing their relative position to the tool and index, which tool must have its cutting-edge at all times on a radial line at right angles to a line through the centers $b$, and at the same time the tool-block moves laterally to give to the face of the cut the proper curve for the tooth.

It is obvious that numerous minor changes may be made in this apparatus. If the tool is held without lateral motion on the frame, the tangent-screw $f$ and wheel $d$, or their equivalents, must be used. If the tool-holder has a lateral motion the said screw and wheel $d$ may be dispensed with. A substitute for the screw to turn wheel $d$ may be made by using a lateral slide on the frame in a grooved templet on said wheel $d$.

I claim as my invention in the above-described gear-cutter—

1. The combination of the index-wheel $c$ and mandrel $m$ with the forming-wheel $d$, moved by a tangent-screw, $f$, or its equivalent, substantially as and for the purposes herein set forth.

2. The combination of the mandrel $m$ with the cutting-tool having a movement on the centers $b$, and governed by an index and forming movement, substantially as and for the purposes specified.

3. The tool-block $w$ $w'$ and frame $z$, in combination with mandrel $m$, by which I cut radial teeth on a globular surface, as described.

In witness whereof I have hereto set my hand this 3d October, 1872.

JOHN JAMES GREENOUGH.

In presence of—
 G. E. THROOP,
 JOHN WOOD.